July 4, 1967 M. DENENBERG 3,329,547
METHOD AND APPARATUS FOR MAKING A LAMINATE WITH UNBONDED EDGE
Filed April 15, 1963 4 Sheets-Sheet 1
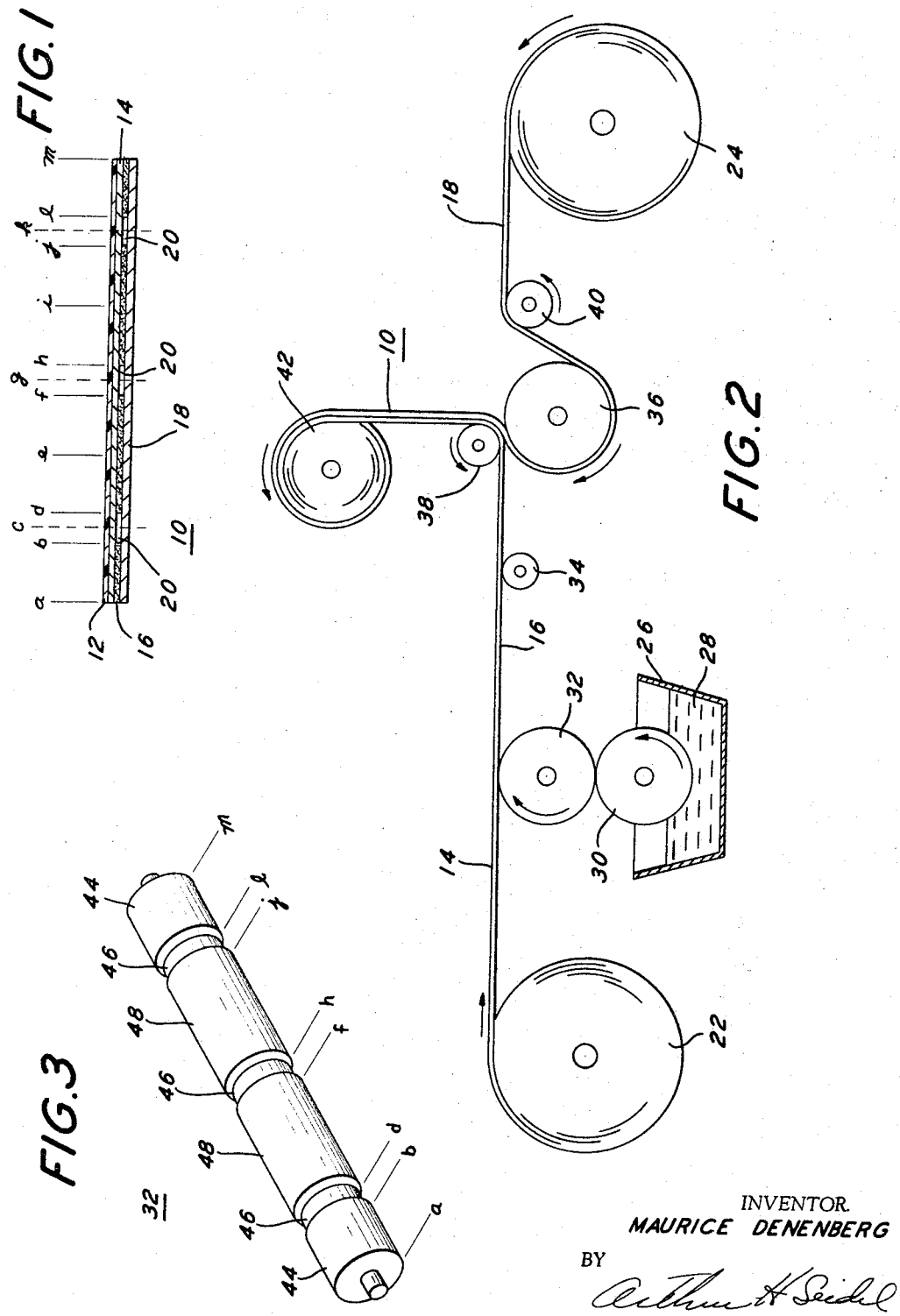
INVENTOR.
MAURICE DENENBERG
BY
ATTORNEY INVENTOR.
MAURICE DENENBERG
BY
Arthur H Seidel
ATTORNEY

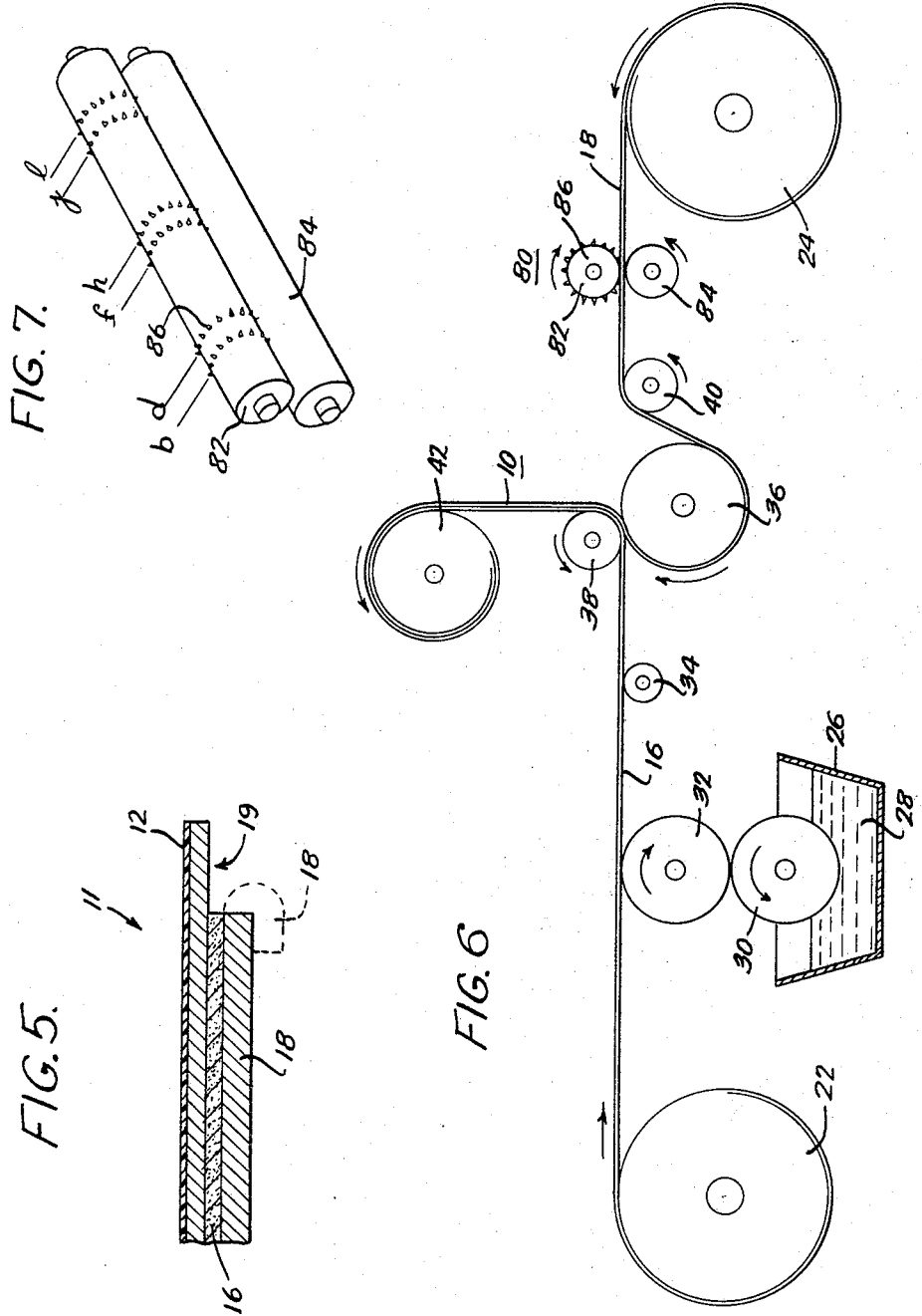

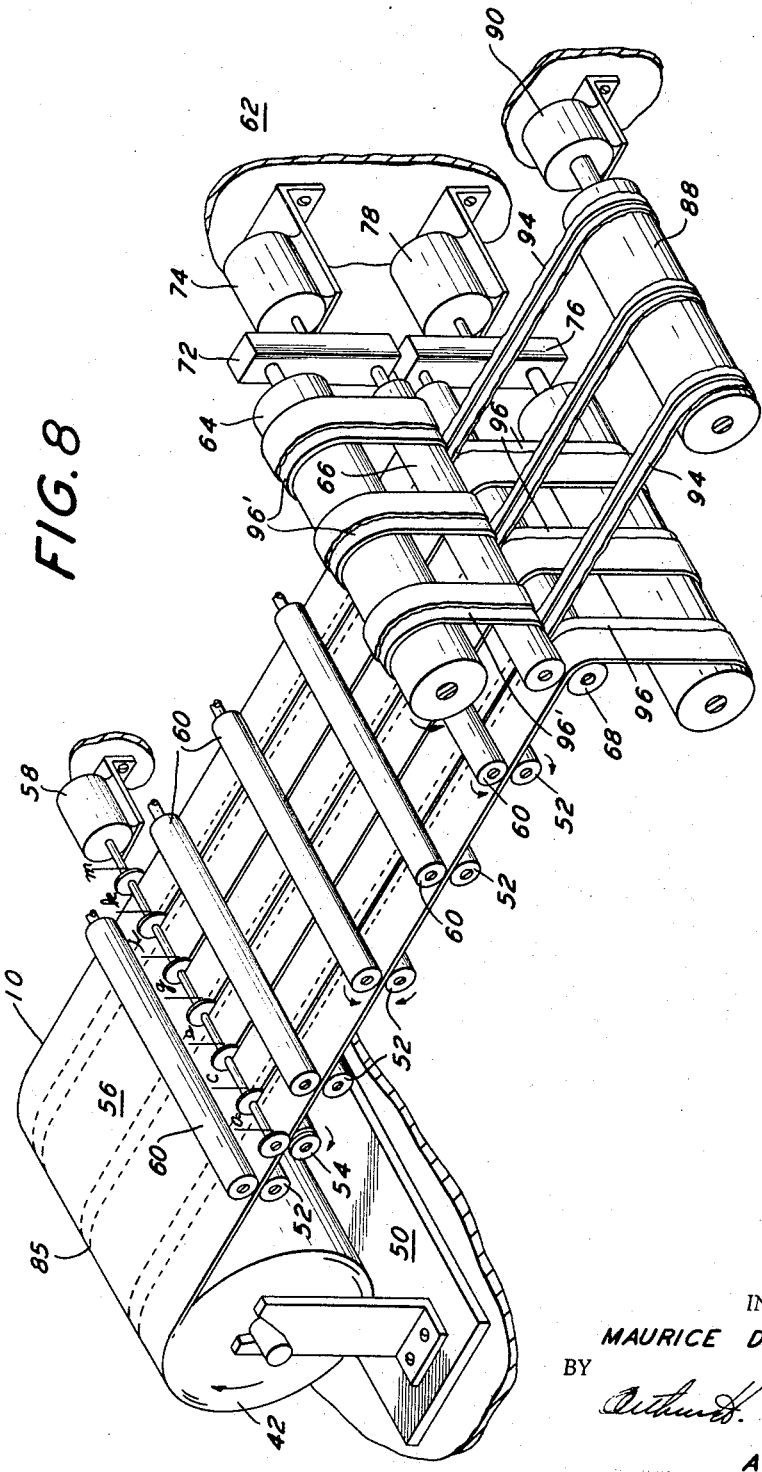

United States Patent Office 3,329,547
Patented July 4, 1967

3,329,547
METHOD AND APPARATUS FOR MAKING A
LAMINATE WITH UNBONDED EDGE
Maurice Denenberg, 20th and Washington Ave.,
Philadelphia, Pa. 19146
Filed Apr. 15, 1963, Ser. No. 273,806
17 Claims. (Cl. 156—247)

This invention relates to a new and useful laminate and to a method of and apparatus for producing such laminate for industrial purposes. More particularly, this invention relates to such new and useful laminate and its production wherein metal foil or plastic film is laminated to a paper or other backing material.

This invention is a continuation-in-part of my co-pending applications S.N. 178,403 filed Mar. 8, 1962 now abandoned, and S.N. 188,681, filed Apr. 19, 1962 now abandoned, each entitled "Laminate Machine" and my co-pending application S.N. 171,009, filed Feb. 5, 1962, entitled "Container Tubing" now forfeited.

In the use of laminated strips and sheets for production of articles of manufacture, it is often desirable to overlap adjacent such strips or sheets to provide an article having a greater dimension in at least one direction than the dimension of the strip or sheet. Where the article is to be used in contact with a substance tending to affect or be affected by a subsurface layer of the laminate, it is necessary that the contacting surface layer of the laminate be resistant to action by such substance and it is further necessary or highly desirable to inhibit contact at the overlaps of subsurface layers with substances normally tending to affect such layers; this is particularly true where the overlap of laminate material includes an edge of the subsurface layer.

Particularly, in the production of containers from such laminate material joined at overlapping edges, the surface material to be exposed to a contained liquid may be such a material as a metal foil or nonreactive plastic film and the layer immediately below the surface layer may be of such fibrous composition as paper. Undesirable absorption of the contained liquid into the paper subsurface at overlapping edges should be avoided. For example, where spiral wound tubing is used as a container, e.g., cut to desired length and provided with a top and bottom, and where the innermost layer of the spiral tubing is a metal foil-paper laminate with the metal foil surface disposed inwardly, absorption or other action on the paper can be a problem, especially where the container is intended to be utilized as an oil can, beer can, or the like. In such cases, it has been proposed to fold an edge of laminate stripping material from which the spiral container is wound, back upon itself with paper surface facing paper surface to provide an end aluminum foil surface, the folded under aluminum foil overlapping the next subsequent winding to provide an absorption resistant edge. However, such structure normally includes three thicknesses of the laminate material as each joint per thickness of adjacent material resulting in bulged seams, which may be perceptible from the exterior of the container even with additional windings of paper or other material thereover, especially when the inner diameter of the tubing is maintained relatively constant along the length thereof and where a thin wall light weight container is produced.

It is the general object of this invention to provide a new and useful laminate and new and useful production of such laminate, which laminate is particularly useful where overlapping seams are desired.

The laminate which may be formed in accordance with the present invention is a laminate of the desired surface material, e.g., metal foil or plastic film, on a backing sheet, e.g., a strip of plastic film or paper, wherein at least one edge of the surface sheet extends beyond the backing sheet. Metal foil-paper laminate and the like may be normally made by adhesive coating one of the layers to be laminated, e.g., metal foil or paper, and rolling or otherwise pressing the two layers together to form a bonded laminate structure. Laminates produced in accordance herewith, may be made by omitting the adhesive bonding along one edge of the laminate during production so as to form a space along the edge and thereafter, if desired, removing the backing paper along the edge which is not laminated to the surface sheet.

It is a further object of this invention to provide a new and useful method and apparatus for producing a laminate having a surface layer extending at at least one edge beyond the edge of the backing sheet.

Another object is to provide a better and more simple method of producing a laminate wherein the tolerances are more flexible, and to provide a better laminate producing machine.

Another object of this invention is to provide a better means for producing from wide sheets of backing material and wide sheets of surface material, e.g., metal foil or plastic film, strips of surface material-backing material laminate wherein one edge thereof is unlaminated.

In the production of a form of laminate structure, a single sheet of laminate with longitudinally extending gaps therein may be provided, which gaps are spaced equidistant across the width of the laminate. The spacing is preferably equal to the desired width of laminate desired to be produced for later use in forming a desired finished article of manufacture such as container tubing. The sheet of laminate is then cut along the line where the adhesive between the surface sheet and backing sheet ends and the longitudinally extending opening in the laminate structure begins. However, more advantageously, the width of the unlaminated gaps in the laminated sheet may be twice the width of the laminated portion of the desired strip of material, e.g., for use in making spiral wound containers or the like, so that a less exacting cut through approximately the center of each gap and along the length of the strip may be made. The metal foil or plastic surface material overlapping at the strip may be utilized to produce a water-tight seal or the like in the manufacture of container tubing.

In another advantageous aspect of this invention, laminate strip material may be produced having the backing material more readily removable along at least one edge thereof.

Other objects and advantages of this invention will be apparent from the following description and from the drawings in which:

FIGURE 1 is a cross sectional view of a sheet of laminate made in accordance with the present invention;

FIGURE 2 is a side elevational view of a form of apparatus adapted to make the laminate of FIGURE 1;

FIGURE 3 is a perspective view of the row 32 shown in FIGURE 2;

FIGURE 5 is a cross sectional view of a strip of laminate produced from a sheet such as illustrated in FIGURE 1;

FIGURE 6 is a side elevational view of another form of apparatus adapted to make a laminate such as illustrated in FIGURE 1;

FIGURE 7 is a perspective view of the perforator roll 80 shown in FIGURE 6; and

FIGURE 8 is a perspective view of an apparatus adapted to use laminate such as illustrated in FIGURE 1 to produce strips of industrial laminate in accordance with a form of the present invention.

Figure 4:
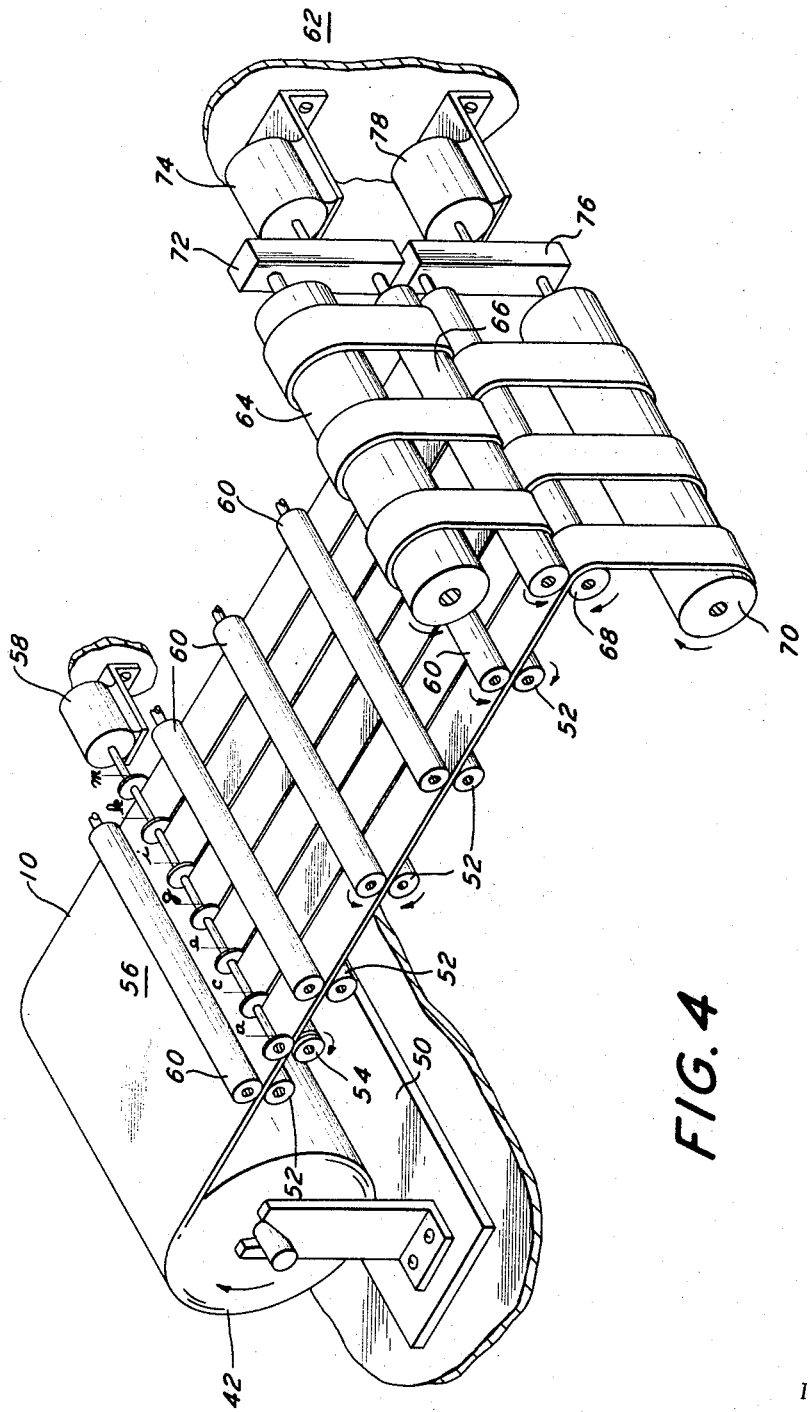
FIGURE 4 is a perspective view of apparatus adapted to use the laminate of FIGURE 1 to produce strips of industrial laminate in accordance with the present invention.

While this invention is susceptible of embodiment in many different forms, there is shown in the drawings and will herein be described in detail an embodiment and modification thereof with the understanding that the present disclosure is to be considered as an exemplification of the principles of the invention and is not intended to limit the invention to the embodiment or modifications illustrated or described in detail.

Referring to the drawings in detail, like numerals indicate like elements.

In FIGURE 1 there is shown a cross section of a sheet 10 of laminate capable of being made by the apparatus of the present invention. The sheet of laminate 10 consists of a layer 14 of metal foil, a layer 18 of paper, a layer 16 of adhesive bonding the layers of metal foil and paper together and an optional layer 12 of wax coated on the metal foil layer 14. At spaced intervals across the width of the laminate 10 there are placed longitudinally extending openings 20 in the adhesive layer 16. Distances across the width of the laminate 10 have been shown by letters $a$–$m$. The distance $a$–$c$ denotes the width of a strip of laminate desired for industrial use as discussed previously. Such a strip of laminate would have one edge unlaminated due to the opening 20 along one side thereof. In one form, the portions or strips of paper 18 bridging openings 20 may be removed so that only the metal foil 14 and its layer of wax 12 appear on the final product where openings 20 are shown.

The distance $a$–$b$ equals the distances $d$–$e$, $e$–$f$, $h$–$i$, $i$–$j$, and $l$–$m$. The distance $b$–$d$ equals the distances $f$–$h$ and $i$–$l$. The center lines $e$, $g$, and $k$ bisect their respective distances $b$–$d$, $f$–$h$ and $j$–$l$.

It can be seen that if the laminate 10 were cut longitudinally along lines $c$, $e$, $g$, $i$, and $k$ there would be produced strips of laminate, each of the same width and length, and each having one side thereof unlaminated. It should also be noted that the cuts along lines $c$, $e$, $g$, $i$, $k$, appear at points where great tolerances are permitted in cutting. Thus, it is not necessary to cut at a point such as $b$ where the adhesive ends and the longitudinal opening 20 begins.

In order to produce a laminate such as shown in FIGURE 1, special apparatus such as is shown and described with reference to FIGURES 2, 3, and 4 was used. Hence, in FIGURE 2 a roll of metal foil 22 and a roll of paper 24 are placed on unwinding reels having brakes (not shown) to maintain tension on the web. The roll of metal foil 14 is shown without the wax coating 12 described previously. This coating is optional and could be coated on the metal foil prior to placement on the unwind reel 22. The metal foil 14 is maintained under tension by the brake on the unwind reel 22 and passes over a grooved adhesive roll 32 which will be described with reference to FIGURE 3.

The adhesive roller 32 applies a liquid adhesive coating to the under side of the metal foil 14. This coating is received from a second adhesive roller 30, driven by a motor not shown and located in a vat 26 of liquid adhesive 28.

The adhesive coated metal foil passes over an adhesive doctor which is adapted to maintain the thickness of the adhesive coating 16 constant.

The paper 18 is unwound from the roll 24 at a constant tension and at the same speed as the metal foil 14. The paper 18 passes over an idler roll 40 to a main pressure roller 36. The paper 18 and the adhesive coated metal foil 14 pass between the pressure roller 36 and its associated idler roller 38 to bond the layers into the laminate shown in FIGURE 1. It should be noted at this point, that the adhesive coating could as easily have been placed on the paper layer as on the metal foil within the scope of the invention. The newly formed laminate 10 is then wound up on a windup reel 42 driven by a motor (not shown) for later utilization in the apparatus shown in FIGURE 4.

The roller 32 is shown in FIGURE 3. The roller 32 consists of cylindrical surfaces 44 at either end of the roller 32 of equal length. The roll 44 is of a length equal to the distance $a$–$b$ or $l$–$m$ discussed with reference to FIGURE 1. Two additional cylindrical surfaces 48 having the same radii as the cylindrical surfaces 44 are placed in axial alignment with the cylindrical surfaces 44. The cylindrical surfaces 48 have a length $d$–$f$ which is exactly twice the length $a$–$d$ of the cylindrical surfaces 44. Grooves 46 separate each pair of cylindrical surfaces 44 and 48. These grooves 46 extend axially a length $b$–$d$, $f$–$h$, or $j$–$l$ as more clearly shown in FIGURE 1.

The roller 32 receives liquid adhesive from the roller 30 only on the surfaces 44 and 48 which come in contact with the surface of the roller 30. The grooves 46 do not receive adhesive from the roller 30 and therefore do not apply adhesive to the metal layer 14. This creates the longitudinal openings 20 in the laminate 10 shown in FIGURE 1.

The reel 42 containing the rolled up laminate 10 is now placed on a stand 50 shown in FIGURE 4. The apparatus herein shown is adapted to cut the laminate 10 into strips of laminate having one side unlaminated, for later industrial usage. The reel 42 is unwound under tension over table roller 52 and its associated backup roll 60. The laminate 10 is kept under tension by a brake (not shown) on the unwind reel 42. It is to be understood that the laminate 10 could be made to pass directly from the pressure roll 36 and idler roll 38 to the table drive rollers 52 without the necessity of having a separate windup roll 42.

The laminate 10 passes over the table roll 52 through spaced knife rolls 56. The spaced knife rolls 56 are driven by a motor 58 at the speed of the laminate 10. Underneath the laminate 10 is a backup roll 54 with spaced grooves (not shown) along the periphery thereof in alignment with the seven knives 56. The knife rolls cut slits in the laminate 10 at points $a$, $c$, $e$, $g$, $i$, $k$ and $m$ corresponding to the points on the laminate discussed with reference to FIGURE 1. The knives at points $a$ and $m$ are simply for the purpose of maintaining the width of the laminate constant and are not essential to the present invention. The sheet 10 passes from the knife rolls 56 in strips corresponding to the distances $a$–$c$, $c$–$e$, $e$–$g$, $g$–$i$, $i$–$k$, and $k$–$m$, discussed with reference to FIGURE 1. These strips are kept in alignment by the backup rolls 60 associated with the table drive rolls 52.

It should be noted at this point that the strips of laminate $a$–$c$, $e$–$g$ and $i$–$k$, have their unlaminated edge to the right as shown in FIGURE 1 and the strips $c$–$e$, $g$–$i$, and $k$–$m$, have their unlaminated edges along the left side as shown in FIGURE 1. In order to produce uniform rolls of laminate strip for later industrial usage, it is necessary that the strip when unrolled come off its spool in the same manner, no matter how manufactured. If the strips of laminate were rolled up in the same direction from the backup roll 60 and table roll 52, those strips having their left edge unlaminated would unroll oppositely from the strip having its right edge unlaminated. In order to compensate for this, a modified duplex rewind system 62 was employed.

This system consists of upper rewind rolls 64 and 66 driven counterclockwise by motor 74 through transmission 72, and roller rewind rolls 68 and 70 driven clockwise by motor 78 through transmission 76.

Those strips of laminate having their right edge unlaminated pass to the lower windup rolls 68 and 70 and the strips of laminate having their left edge unlaminated pass to the upper rolls 64 and 66. In this manner, the strips of laminate removed from the upper windup roll 64 and the lower windup roll 70 will be substantially the same. They will have the same width, cross section, and will unwind from their respective spools in the same manner with their unlaminated edges on the same side.

Turning to FIGURE 5, a laminate material in accordance herewith is illustrated in the form of a channel strip including the optional wax layer 12 on a layer of surface material such as aluminum foil 14 laminated to the backing layer such as paper layer 18 by suitable adhesive 16. The configuration of strip 11 provides a flap of surface material 14 at one edge as indicated by reference number 19 extending beyond the backing material 18. This may be formed from the strips produced above merely by tearing or cutting backing 18 along the inner edge of the nonadhering portion. In spiral winding of such a strip, the lateral extension 19 is used to overlap the edge of the adjacent subsequent winding during normal spiral winding procedures to provide a relatively uniform surface and joint. The outer surface of flap 19 with respect to the spiral configuration receives the inner surface of the next winding providing, for practical purposes, surface material against surface material; suitable adhesive will normally be present between joined surfaces at the overlap.

Although layer 14 has been described as aluminum foil, any desired surface or tube lining material may be usable. Particularly advantageous are metal foil and plastic film, e.g., polyethylene, polypropylene, nylon, etc. Such materials will be apparent to those in the art.

Suitable adhesives for bonding metal foil or plastic film sheets to paper and other backing sheets are known to those in the art. An example of a suitable adhesive for bonding aluminum foil to paper is Borden NT–565, a casein neoprene latex adhesive. An example of adhesive for plastic film (e.g., polyethylene or polypropylene) to paper bonding is ethylene-vinyl acetate copolymer adhesive with small amounts of paraffin wax, usually applied as about 20% in toluene or other solvent. Such usable metal foils, plastic films and adhesives, as well as suitable backing materials are readily available to those in the art.

In FIGURE 5, the dotted lines show the position of the backing material 18 where it is desired to merely fold the backing material away from flap 19 in lieu of cutting the backing material along the line of extent of adhesive 16 as described above. This form of the channel is also very useful and gives the desired joint omitting backing material 18 from between overlapping layers of surface material 14.

Considering a modification of the apparatus and method discussed above, returning now to FIGURE 1, it should be noted that if the paper layer 18 was cut along lines b, d, f, h, j, and l, the spaces b–d, f–h, and j–l would include only the metal foil layers 14 and the optional wax layer 12.

Reference is now made especially to FIGURES 6 and 7 and to FIGURE 3. The operation of similar parts of FIGURE 6 is the same as described with reference to FIGURE 2 above.

As the paper 18 is unwound from the roll 24 at a constant tension and at the same speed as the metal foil 14, the paper 18 passes through perforating rolls 80 from whence it goes to an idler roller 40 to a main pressure roller 36. The paper 18 and the adhesive coated metal foil 14 pass between the pressure roller 36 and its associated idler roller 38 to bond the laminate of FIGURE 1.

The perforating rollers 80 are shown best in FIGURE 7. The perforating rollers 80 consist of an upper toothed roller 82 and a lower backing roller 84. The upper toothed roller 82 has teeth 86 radially located about the circumference of the roller 82. The teeth 86 are spaced at intervals along the cylindrical surface of the roller 82. The teeth 86 are placed at points corresponding to locations b, d, f, h, j, and l of FIGURE 1. That is, they are adapted to make perforations through the paper 18, which will provide three strips b–d, f–h, and j–l in width and spacing across the width of the paper 18. The perforated laminate 10 is wound up on reel 42 for utilization in the apparatus shown in FIGURE 8.

Turning to FIGURE 8, the apparatus includes elements similar to like numbered elements described above with reference to FIGURE 4. In use, reel 42 is placed on stand 50 and unwound under tension through rollers 52 and 60 and cut by spaced knife rolls 56.

Before the strips of laminate are applied to the duplex rewind system 62, the perforated unlaminated paper strips designated as 94 are removed from the sheet. This is done by tearing the sheet along the lines b, d, f, h, j, and l. This tearing produces six strips b–c, c–d, f–g, g–h, j–k, and k–l. These strips 94 are fed to a paper strip windup roller 88. The windup roller 88 is driven by a suitable motor 90. The strips 94 are removed before the laminate is fed to the duplex rewind system 62.

Those strips of laminate having a metal flap portion 96 along their right edge pass to the lower windup rollers 68 and 70 and the strips of laminate having a metal foil flap portion 96' along their left edge pass to the upper rollers 64 and 66. In this manner, the strips of laminate removed from the upper windup rollers 64 and the lower windup roller 70 will be substantially the same.

It will be obvious that the laminate strip might be unbonded along both edges and the paper layer perforated accordingly along both edges. The paper could then be torn off, and the metal flap on both sides of the strip folded over the laminate strip. This would insure a metal to metal bond if the so-manufactured strip were then utilized to form a tubular container. Such a strip has been described above with reference to FIGURE 5.

The present invention may be embodied in other specific forms without departing from the spirit or essential attributes thereof, and, accordingly, reference should be made to the appended claims, rather than to the foregoing specification as indicating the scope of the invention.

What is claimed is:

1. Apparatus for manufacturing strips of laminated material having one unlaminated edge from two sheets of material, which apparatus comprises bonding means for bonding the two sheets together in a laminate structure, said bonding means including means for preventing the bonding of sheets at spaced intervals across the width of the sheets, and cutting means for cutting bonded sheets longitudinally within the unbonded intervals and between the bonded portions whereby laminated strips are manufactured having one unlaminated edge.

2. Apparatus for manufacturing strips of laminated material from two sheets of material comprising bonding means for bonding the two sheets together in a laminate structure, said bonding means including means for preventing the bonding of sheets at spaced intervals across the width of the sheets, means for forming weakened tear lines in one of said sheets to define said intervals and tearing means for tearing the unbonded intervals of said one sheet from said laminated structure whereby laminated strips are manufactured having one edge formed by the other of said two sheets.

3. Apparatus for manufacturing a plurality of strips of laminated material having one unlaminated edge from two sheets of material of equal width comprising bonding means, feeding means for feeding the sheets to said bonding means at the same speed, said bonding means including spacing means for preventing the bonding of the sheets at spaced intervals across the width of the sheets where the intervals are as wide as two unlaminated edges of strips to be manufactured, and cutting means for cutting bonded sheets longitudinally at the center of the unbonded intervals and centrally of the bonded portions whereby laminated strips are manufactured having one unlaminated edge.

4. The apparatus of claim 3 including rewind means for contra-rotatively winding up alternate strips of the bonded sheets across the width of the bonded sheets.

5. The apparatus of claim 3 wherein the bonding means bonds edge and central portions of said sheets with the central portions bounded on both sides by said unbonded intervals and being twice as wide as the edge portions, said edge portions being bounded only along one side by one of said unbonded intervals and terminating at the other side at the edge of the bonded sheet.

6. Apparatus for manufacturing a plurality of strips of laminated material from two sheets of material comprising bonding means, feeding means for feeding the sheets to said bonding means, said bonding means including means for preventing the bonding of the sheets at spaced intervals across the width of the sheets, perforating means for perforating one of said sheets to define said intervals, cutting means for cutting bonded sheets longitudinally within the limits of the unbonded intervals and between the bonded portions and tearing means for tearing the unbonded intervals of said one sheet from said laminated material whereby laminated strips are manufactured having one longitudinal edge formed by the other sheet.

7. The method of manufacturing strips of laminated material having one unbonded edge comprising bonding the sheets together leaving the sheets unbonded longitudinally through a portion of the width of the sheets and cutting the resulting bonded laminate structure longitudinally within said unbonded portion and spaced from the bonded portion of the sheets whereby a laminate strip is manufactured having an unbonded edge.

8. The method of manufacturing strips of laminated material having one unbonded edge of preselected width comprising the steps of feeding two sheets of material to be bonded at the same speed, bonding the sheets together longitudinally leaving the sheets unbonded at spaced intervals twice the selected width of the unbonded edge across the width of the sheets, cutting the so bonded sheets longitudinally at the center of said unbonded intervals and at the center of the bonded portions of the sheets whereby laminated strips are manufactured having an unbonded edge.

9. The method of manufacture of claim 8 wherein the bonding of the sheets includes coating at least one of the sheets with an adhesive material and pressing the sheets together with the adhesive coating therebetween at the same speed as the material is being fed and wherein the cutting is accomplished at the same speed as the feeding of the material.

10. The method of manufacture of claim 8 including the step of contra-rotatively winding up alternate strips of the bonded sheet after cutting.

11. The method of manufacturing strips of laminated material having one edge of preselected width of a single sheet comprising the steps of perforating at least one sheet at predetermined spaced intervals twice the width of said preselected width across the width of the sheet, bonding the sheets together longitudinally leaving the sheets unbonded at spaced intervals of a width defined by the perforations in said at least one sheet, cutting the so bonded sheets longitudinally within said unbonded intervals and between the bonded portions of the sheets, and tearing the perforated unbonded intervals of the one sheet from the resulting laminated material whereby laminated strips are manufactured having one edge of a single sheet of material.

12. The method of manufacture of claim 11 wherein the step of tearing the unbonded intervals of the one sheet occurs simultaneously with a step of contra-rotatably winding up alternate strips of the bonded sheets after cutting.

13. The method of manufacture of claim 12 wherein the tearing of the sheet is accomplished in a first plane, and the strips are contra-rotatively wound up from a second plane substantially perpendicular to the first plane to aid the separation of the unbonded intervals of the one sheet from the bonded sheet.

14. The method of claim 7 wherein said one sheet is paper and said other sheet is metal foil.

15. The method of claim 7 wherein said one sheet is paper and said other sheet is plastic film.

16. The method of claim 7 wherein said one sheet is plastic film and said other sheet is metal foil.

17. The method of claim 7 wherein both said sheets are plastic film.

References Cited

UNITED STATES PATENTS

| | | | |
|---|---|---|---|
| 536,604 | 4/1895 | Conley | 161—145 |
| 1,137,278 | 4/1913 | Peterson | 161—145 |
| 1,466,380 | 8/1923 | Nusbaum et al. | 91—68 |
| 2,304,787 | 12/1942 | Avery | 156—248 |
| 2,560,566 | 7/1951 | Graves et al. | 156—295 |
| 2,794,761 | 6/1957 | Williamson | 156—252 |
| 3,037,852 | 6/1962 | White | 156—247 |

FOREIGN PATENTS

| | | |
|---|---|---|
| 717,072 | 5/1952 | Great Britain. |

EARL M. BERGERT, *Primary Examiner.*

W. E. HOAG, *Assistant Examiner.*